UNITED STATES PATENT OFFICE.

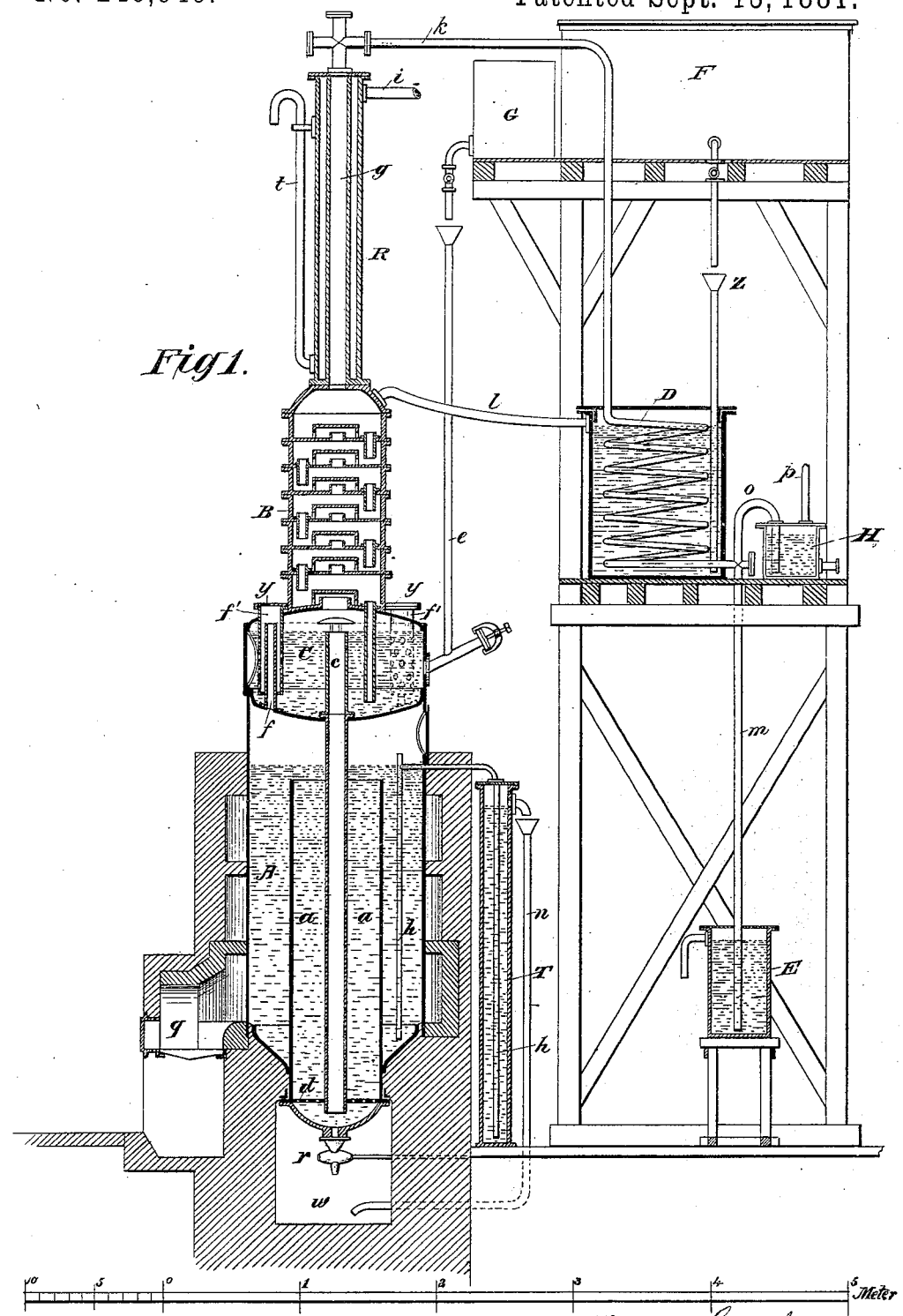

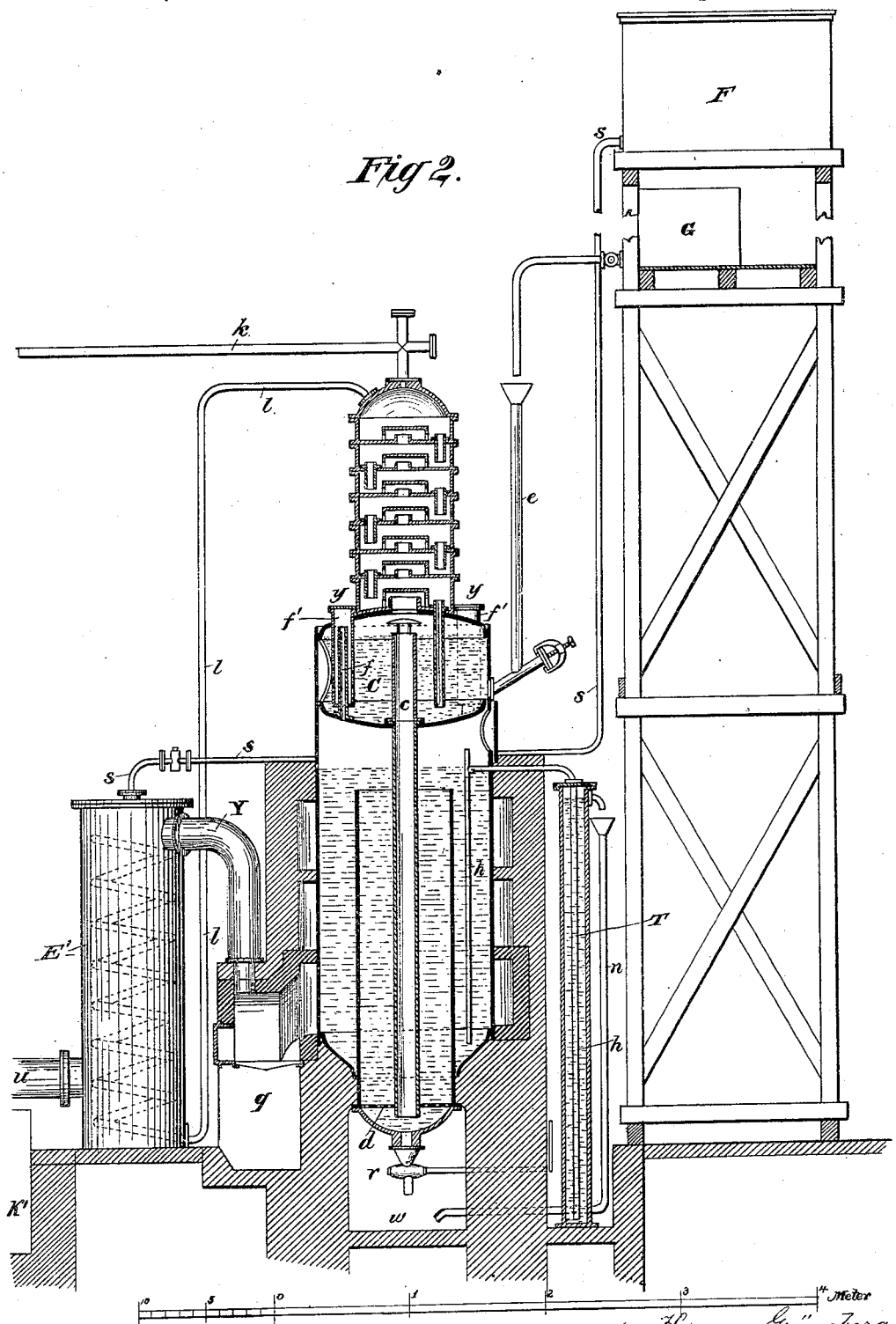

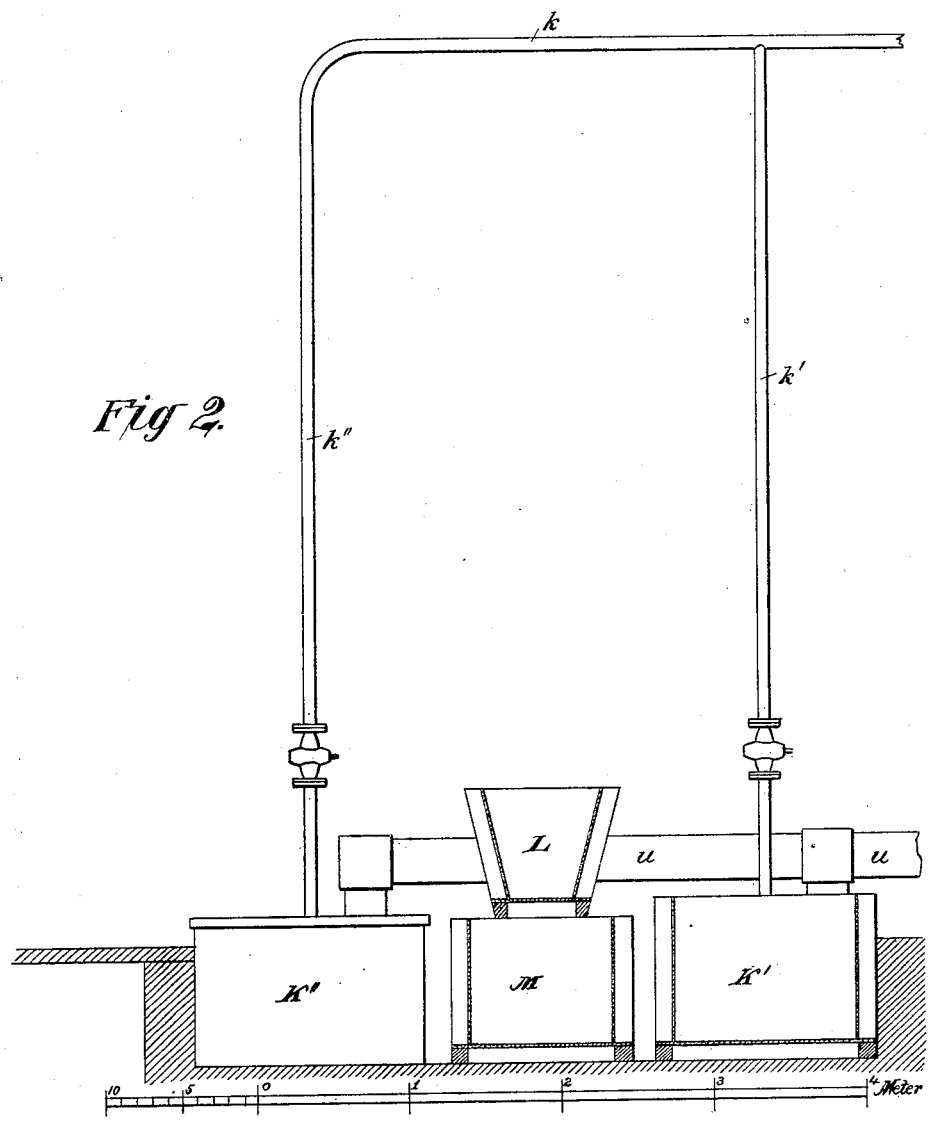

HERMANN GRÜNEBERG AND JACOB GAREIS, OF KALK, NEAR COLOGNE, PRUSSIA, GERMANY.

APPARATUS FOR THE CONTINUOUS DISTILLATION OF AMMONIA.

SPECIFICATION forming part of Letters Patent No. 246,949, dated September 13, 1881.

Application filed February 18, 1881. (No model.) Patented in Germany May 21, 1878, and October 29, 1879, in Belgium December 16, 1878, in England December 11, 1879, and in Italy March 31, 1880.

*To all whom it may concern:*

Be it known that we, HERMANN GRÜNEBERG, doctor of philosophy, and JACOB GAREIS, engineer, both residing in Kalk, near Cologne, Prussia, have invented a new and useful Apparatus for the Continuous Distillation of Ammonia from Ammoniacal Liquors, (for which invention, or a part of the same, patents have been granted to one of us, HERMANN GRÜNEBERG, in Germany, under No. 5,255 on the 21st of May, 1878, and No. 9,392 on the 29th October, 1879; in Belgium under No. 46,787 on the 16th December, 1878; in Great Britain under No. 5,075 on the 11th December, 1879; in Italy on the 31st March, 1880, while an application for a patent was filed in Sweden on the 22d November, 1880,) of which the following is a specification.

Our invention relates to an apparatus serving for the distillation of ammonia from crude ammoniacal liquors and for the decomposition of the salts of ammonia contained in such liquors, the combined process being carried out in a continuous manner.

In Figure 1 of the annexed three sheets of drawings the form of apparatus is shown, which we employ when a concentrated aqueous solution of ammonia is to be produced, while Fig. 2 (divided in two parts on sheets 2 and 3) represents a modified apparatus for the manufacture of sulphate of ammonia.

A is a vertical boiler, heated by the products of combustion from a furnace, $q$, carried in flues around the boiler. Within the boiler there is a tube or cylinder, $a$, open at the top and extending down below the bottom of the boiler, where it is provided with a blow-off cock, $r$, and a perforated screen, $d$.

Above the boiler, and by preference forming a part of the same, there is a vessel, C, serving for the decomposition of the ammonium-salts contained in the liquor, and above this vessel a distilling-column, B, is placed, such as is ordinarily employed in spirit-stills, divided by horizontal partitions into numerous compartments, communicating with each other by pipes. The liquor to be distilled, and which is contained in the reservoir F, flows through the funnel-pipe Z into the vessel D, containing a condensing-worm, and is conducted from there by the pipe $l$ into the upper part of the column B. The liquor, while passing the different divisions of the column, is heated by the steam and vapors of ammonia rising from the boiler, whereby the greater part of volatile ammonia contained in the same is expelled. From the bottom of the column the liquor, which still holds in solution the non-volatile compounds of ammonia, together with part of the ammoniac gas, flows into the decomposing-vessel C, into which lime-milk is introduced at intervals from the reservoir G by a pipe, $e$, for the purpose of decomposing the said ammoniacal compounds. The mixing of the lime-milk with the liquor is caused by the steam passing from the boiler A into the vessel C by means of the pipes $f$ and $f'$, inserted into each other and arranged in such a manner that the steam rising in $f$ descends in the annular space between $f$ and $f'$, and finally passes through perforations at the lower end of $f'$, whereby the liquor is agitated and the decomposition promoted.

The contents of the vessel C are raised to the requisite temperature, partly by the steam passing into the same and partly by the heat communicated from the steam in A through the bottom of C. The pipes $f$ and $f'$ are arranged inside of the vessel for preventing a cooling of the steam on its passage from A to C. The pipes $f'$ are, moreover, provided with covers $y$, so that any obstructions which may be formed in the course of time by an accumulation of carbonate of lime can with facility be removed.

In the same measure as liquor flows from B into C the liquor which has undergone the decomposing process, and which in consequence contains ammonia in a volatile state only, will flow from C, by the overflow-pipe $c$ $b$, into the tube or cylinder $a$, the small quantity of lime carried along by the liquor being deposited beneath the perforated screen $d$. As the lower part of the said pipe $a$ is not exposed to the fire no incrustation from the lime can be formed within the same. The liquor rising in the pipe $a$ flows over into the boiler A, where the remaining ammonia is expelled from the liquid. This ammonia passes, together with the steam generated in A, by the pipes $f$ and $f'$, into the decomposing-vessel and into the distilling-column. The total quantity of ammonia liberated in the boiler, the vessel C, and the column B, and a part of the steam produced, are conducted by the pipes $g$ and $k$ from the top of the column to the condensing-worm D contained in a closed vessel, into which the liquor to be distilled flows in a continuous stream from the reservoir F.

Instead of the worm D a set of pipes suitably arranged may be used. The liquor is thus heated on its way to the column B, while the steam and the ammoniac gas passing through the worm are condensed, the concentrated and pure ammoniacal liquor produced flowing, by the pipe $m$, into the receiver E. The incondensable gases liberated simultaneously with the ammoniac gas are led by the pipe $o$ to the vessel H, containing sulphuric acid, which forms a hydraulic seal, and are thence allowed to escape into the atmosphere or into the fire.

The degree of concentration of the ammoniacal liquor to be produced may be regulated by the apparatus R, placed on top of the column B, and consisting of the vertical tube $g$, surrounded by a water-jacket, into which cold water is allowed to flow by the pipe $i$, while the warmed water runs off by pipe $t$. In the tube $g$, which leads the products of distillation away from B, a partial condensation of the aqueous vapors takes place, the liquid resulting from such condensation flowing back into the column, while the vapors passing off from $g$ will contain more ammonia in proportion as the tube $g$ is kept cooler. The liquid from which the ammonia has been completely expelled flows from the bottom of the boiler A by the pipe $h$ into the vessel I, by means of which a hydraulic sealing of the boiler is obtained, and is finally conducted into the channel $w$ by the pipe $u$. The lime settling at the bottom of the tube $a$ is blown off from time to time by the cock $r$, which also serves, together with other cocks attached to the boiler and to the vessel C, for completely emptying the apparatus. For the purpose of cleaning the same, suitable man-holes are provided.

When the apparatus is to be used for the manufacture of sulphate of ammonia we employ the arrangement shown by Fig. 2. The vapors are in this case led off from the column B in their hot state, the cooling apparatus R shown in Fig. 1 being omitted. They are conducted by the pipes $k$, $k'$, and $k^2$ into the vessels K' and K² containing sulphuric acid. These vessels are used alternately, so that one is in operation while the other is being emptied of the sulphate of ammonia produced within the same.

In the vessel which is in use the combination of the ammoniac gas with the sulphuric acid takes place under a generation of heat sufficient to convert into steam the entire surplus amount of water contained in the acid. This steam escapes by the pipe $u$, together with the steam, the incondensable gases, and various offensive gases originating from the ammoniacal liquor into the vessel E', and thence, by the pipe $v$, into the furnace, where the offensive gases are burned.

In the vessel E' a worm or set of pipes is contained, in which the ammoniacal liquor flowing from the reservoir F by the pipe $s$ is heated previous to its being conducted into the column by the pipe $l$.

The sulphate of ammonia produced in the vessels K' and K² is scooped into the box L, provided with a perforated bottom, so that the adhering liquor may flow off into the reservoir M. The sulphate is subsequently spread out on inclined planes for complete desiccation.

We claim as our invention—

1. In an apparatus for the continuous distillation of ammonia from crude ammoniacal liquors, the combination of a boiler, A, a decomposing-vessel, C, in communication with the boiler by a suitable pipe or pipes, and into which lime-milk is introduced from a reservoir, G, and a distilling-column, B, which first receives the liquor to be treated, the parts being arranged in respect to each other substantially as hereinbefore described.

2. In combination with the boiler A, the decomposing-vessel C and distilling-column B, the tube or cylinder $a$, projecting through the bottom of A, and the overflow-pipe $c\ b$, leading from the upper part of C to the bottom of $a$, substantially as and for the purpose specified.

In testimony whereof we have signed our names to this specification in the presence of two subscribing witnesses.

HERMANN GRÜNEBERG.
JACOB GAREIS.

Witnesses:
H. SPRINGMANN,
ERASMUS PAUL.